United States Patent [19]
Cordier et al.

[11] Patent Number: 4,753,178
[45] Date of Patent: Jun. 28, 1988

[54] PROCESS AND MEANS FOR DRYING SMOKE OR FUMES PRIOR TO DISCHARGE

[75] Inventors: Rémy Cordier, Le Plessis Robinson; Dominique Pelloux-Prayer, Rueil Malmaison, both of France

[73] Assignee: Gaz de France, Paris, France

[21] Appl. No.: 52,823

[22] Filed: May 22, 1987

[30] Foreign Application Priority Data

May 22, 1986 [FR] France ................. 86 07304

[51] Int. Cl.$^4$ ............................................. F23L 15/00
[52] U.S. Cl. .................................... 110/303; 110/203; 110/304; 165/921; 237/55
[58] Field of Search ............... 110/203, 297, 301, 302, 110/303, 304, 205, 206, 207; 237/55; 165/901, 111, 921

[56] References Cited

U.S. PATENT DOCUMENTS

| 2,711,683 | 6/1955 | Ryder | 237/55 X |
|---|---|---|---|
| 4,205,630 | 6/1980 | Regan | 110/304 X |
| 4,241,874 | 12/1980 | Schossow | 237/55 |
| 4,294,223 | 10/1981 | Montague | 237/55 X |
| 4,300,920 | 11/1981 | Grove | 165/921 |
| 4,416,254 | 11/1983 | DiPietro | 237/55 X |

FOREIGN PATENT DOCUMENTS

| 102770 | 3/1984 | European Pat. Off. . |
| 2263319 | 8/1973 | Fed. Rep. of Germany . |
| 2406467 | 8/1975 | Fed. Rep. of Germany . |

Primary Examiner—Steven E. Warner
Attorney, Agent, or Firm—Pollock, VandeSande & Priddy

[57] ABSTRACT

A process and apparatus for removing moisture from smoke produced in a chemical reaction, such as a combustion reaction, by circulating outside air in heat-exchange relationship with smoke at a point near the chamber where the smoke is produced, thereby heating the air and cooling and partially dehydrating the smoke. A portion of the air which is thus heated is passed in further heat-exchange relationship with smoke and is then directed toward a smoke discharge stack where it is mixed with the partially dehydrated smoke.

13 Claims, 1 Drawing Sheet

PROCESS AND MEANS FOR DRYING SMOKE OR FUMES PRIOR TO DISCHARGE

The invention concerns a process for drying "wet" smoke or fumes produced in a chemical reaction, before said smoke or fumes are discharged through the stack. The reaction may be a combustion reaction inside a boiler.

The invention is particularly intended for use with a gas-fired condensing boiler.

BACKGROUND OF THE INVENTION

It is known that the natural gas combustion reaction produces considerable amounts of steam containing nonnegligible amounts of acids. Thus, the smoke that issues from the boiler and moves toward the stack through an exhaust line is corrosive and laden with humidity. If the temperature of the walls of the exhaust line or stack is lower than the dew point of the smoke, a portion of the steam contained in that smoke will condense on the walls, which is particularly damaging to their mechanical resistance and may bring about a substantial degradation of their structure.

In general the exhausts of a traditional boiler are hotter than the wall of the exhaust line despite the rather considerable cooling they undergo, particularly at the level of the stack. However, condensation may sometimes occur, particularly under unfavorable climatic conditions.

In a condensing boiler, the product of combustion, or "smoke," is cooled in order to recover part of the latent heat of the steam it contains. Therefore the exhausted smoke is saturated with moisture and is all the more liable to condense in the exhaust line or stack, causing the latter to deteriorate.

In order to avoid this problem, the prior art provides a number of solutions.

First, it is possible to protect the exhaust line or stack against the harmful effects of condensation by installing a sealed tube within the exhaust line and connecting said tube to the boiler outlet so that it replaces the old line in exhausting the products of combustion. Of course, such tubes must show good resistance to chemical corrosion by acid condensates. Furthermore, it is necessary to ascertain that the cross-section of the replacement line remains wide enough to exhaust the smoke. If it is no longer wide enough, mechanical extraction methods must be used.

This solution, while effective in some cases, is costly and difficult to implement, particularly where the pipes and lines are very high or very long.

Another solution offered in the prior art consists of lining the inside of the smoke exhaust line with a special mortar that is sufficiently water-repellent to constitute a sort of sleeve for the pipe. However, this solution is difficult to implement, costly, and not always practicable.

Rather than seeking to protect the line, it is also possible to try to dehumidify or dry the "wet" smoke before sending it into the pipe so that it will not condense there. A heat pump evaporator may be made to serve for this purpose. However, for such a solution to be effective in partially drying smoke under the most unfavorable conditions (i.e., when the heat of vaporization is high and the outside temperature low), the heat energy transmitted to the evaporator must constitute a significant share of the power generated by the boiler's burner. In this case, the power output of the heat pump represents a sizable portion of the installed power, which requires significant modifications in the operation of the heat plant, e.g., in the regulating apparatus or in the form of a possible short-circuiting of the recuperator. Furthermore, in order properly to exhaust the smoke that emerges from the heat pump dry but at a relatively low temperature, it is generally necessary to provide for a superheater and/or for mechanical extraction.

This solution is therefore difficult to apply to existing heating plants and, because of the great size of the heat pump and the changes that must be made to the installation, it remains especially costly.

The process of the invention is designed to remove the abovementioned drawbacks, with which the prior art has not dealt satisfactorily.

SUMMARY OF THE INVENTION

Accordingly, the invention provides the following elements for the purpose of drying "wet" smoke produced by a boiler, before said smoke is discharged through the stack:

a flow of outside air is taken in at a temperature lower than that of the smoke and is circulated in such a way as to exchange heat with the smoke near the point at which said smoke leaves the boiler;

at least a part of said outside air, which was heated in the previous step, is recycled and sent toward the stack;

the partially dehydrated smoke is mixed with said recycled air.

According to an important characteristic of the invention, occurring during the heat exchange between smoke and outside air, a portion of the steam contained in said smoke is condensed and the resulting condensates are eliminated. In order to avoid all risk of condensation in exhaust lines or stacks, the process of using heat exchange to condense a portion of the steam contained in the smoke is supplemented by a reduction in the residual water content of the partially dehydrated smoke brought about by diluting said smoke with some of the air used to dehydrate it, air which was thereby heated. The dry and dew points of the resulting recycled air/smoke mixture are such that the mixture can be sent to the stack with practically no risk of condensation.

According to another characteristic of the invention, after outside air has circulated through the smoke in a heat exchanging process, but before recycled air is mixed with the partially dehydrated smoke, this same recycled air is made to circulate through said smoke in a second heat exchanging process, thereby again raising the temperature of the air that is to dilute the dried smoke. This has the effect of improving the heat efficiency of the installation.

The invention also concerns an installation for implementing the process. It contains:

at least one initial exchanger installed in the exhaust circuit, within which a stream of air taken in from the outside is combined in a heat exchanging process with smoke issuing from the boiler; and a circuit for recycling at least some of the air that passes through the first exchanger, with said recycling circuit being connected to the air outlet of said first exchanger and to the exhaust circuit, downstream from the point at which smoke leaves said first exchanger.

BRIEF DESCRIPTION OF THE FIGURES

Other characteristics and advantages of the present invention will become more clearly apparent from the following description, made with reference to the accompanying drawings, in which.

DETAILED DESCRIPTION OF THE INVENTION

Figure 1:
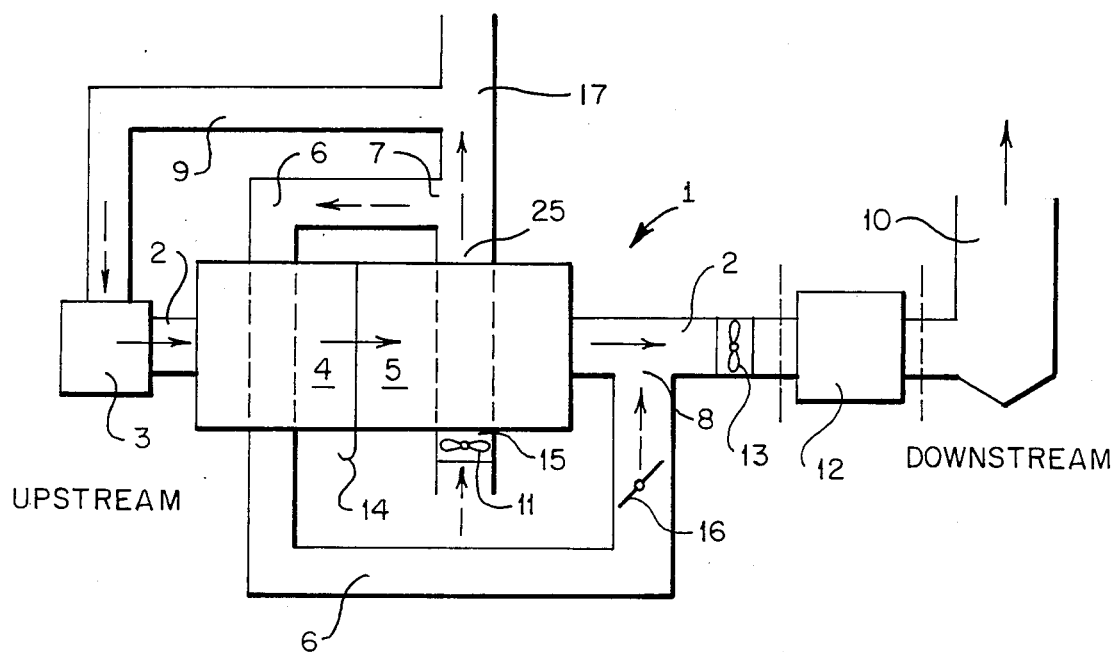
FIG. 1 is a diagram of the heating plant circuit under the invention.

With reference first to FIG. 1, the means of the invention are designated in the diagram by the numeral 1. Said means are designed to dry "wet" smoke produced, in this case, in the combustion chamber of a boiler 3, before said smoke is discharged through the stack.

Drying means 1 comprise in particular a circuit 2 for exhausting smoke issuing from the burner of a boiler 3, as well as two heat exchangers 4, 5 placed in series in exhaust circuit 2.

Said means will function with any type of boiler. However, it is well known that problems of acid condensation in exhaust lines and stacks are more sensitive in the case of gas-fired condensation boilers. This is because the temperature of the exhausted smoke leaving the boiler is relatively low and the smoke is heavily laden with water vapor, which will tend to condense and cause damage to the exhaust lines or stack if these are not protected.

For this reason, the smoke-drying means of the present invention are particularly designed to be used with gas-fired condensing boilers.

Before describing the newly invented installation in greater detail, it will be noted that the figures show the directions of flow of smoke and air, in solid and broken lines respectively. In addition, FIG. 1 indicates the upstream and downstream ends of the means of the invention.

Near the point at which it leaves boiler 3, the wet smoke moves across exchangers 4 and 5, in accordance with the embodiment illustrated in FIG. 1, moving first into air/smoke exchanger 4 (called the second exchanger because it is positioned second in the air circulation path), and then into air/smoke exchanger 5 (called the first exchanger because it is placed first in the air circulation path).

However, if operating conditions and heat efficiency so require, this order may be reversed so that the smoke issuing from the boiler meets exchanger 5 first, followed by exchanger 4. It would also be possible to provide only exchanger 5.

At the level of exchanger 5 air, in a significant flow and at a temperature that is lower than the temperature of the smoke, is advantageously forced by a fan 11 located near air intake 15 to circulate in a heat exchanging process with smoke. In general, the air intake temperature will be lower than the dew point of the smoke.

In the course of this heat exchange process, the smoke heats the flow of outside air, while some of the water vapor contained in the smoke condenses on the surfaces of the exchanger.

The condensates thus formed are eliminated at 14.

Near air outlet 25 of exchanger 5, some of the outside air that has just been heated is recovered and recycled into a circuit 6, to be sent toward stack 10.

At point 8 downstream from the exchangers, the recycled air emerges into smoke exhaust circuit 2 and there mixes with smoke that has just been partially dehydrated.

The aspiration and draw of the installation are ensured or facilitated by fan 13 placed in exhaust circuit 2.

Advantageously, said fan 13 functions only when boiler 3 is in operation. In other words, its operation is interrupted when the burner shuts off. This avoids having currents of air cooling the exhaust circuit 2 and the stack between heating cycles, which would be thermally disadvantageous.

Prior to being mixed, the recycled air again moves through a process of heat exchange with the smoke in exchanger 4.

Said exchanger 4 serves essentially to raise the temperature of the recycled air, which has already been preheated in exchanger 5, where the smoke was in large part dehydrated.

In this way, the smoke is diluted (at 8) with hot and relatively dry air, making possible a noticeable reduction in the residual water content of the already partially dehydrated smoke before said smoke is discharged through the stack.

It will be understood that if the smoke from boiler 3 were to encounter exchanger 4 first, the recycled air circulating at that point would be raised to a higher temperature than if said exchanger 4 were positioned after exchanger 5 in the smoke circuit.

Advantageously, the smoke will move without interruption from one exchanger to the other, since exchangers 4 and 5 are placed one after the other.

It will be noted that the portion of outside air that moves through exchanger 5 but is not recycled to dilute the smoke may be at least partially returned to boiler 3 through pipe 9. It this is done, it can serve to preheat the combustion air used by the boiler's burner. Such a use is thermodynamically beneficial.

The remaining air that is neither recycled (at 6) nor optionally returned to the boiler (3) is preferentially channeled through a line 17 that may emerge in, or pass through, an area to be heated.

By way of nonlimitative example, the flow of recycled air could be made substantially equivalent to the amount of smoke produced by the boiler, while the flow of outside air admitted into exchanger 5 may be approximately five to 10 times the amount of said smoke.

However, it will be noted that advantageously the amount of captured outside air will be at least that amount required for dilution of the smoke downstream from the exchangers and for combustion in the boiler's burner. In other words, the flow of outside air will be adapted to the desired operating conditions. In particular, it will be noted that a flap 16, set in recycling line 6, makes it possible to vary and regulate the flow of diluting air.

If the conditions of installation of the plant, as well as the climatic conditions, are unfavorable, it may be necessary to have recourse to a superheater 12 positioned on exhaust circuit 2 downstream from exchangers 4 and 5 and from junction 8. Because the smoke "dehydration" unit of the invention is particularly designed for use on complete, pre-existing heating plants, without requiring extensive and fundamental modifications thereto, it may well be that the geometric characteristics of the existing lines will not permit a sufficient reduction in the risks of condensation if the outside temperature is particularly low. In such a case, the dilute mixture of recycled air and partially dehydrated smoke may be advantageously superheated, e.g., using a superheater 12. It might also be possible, for example, to have the smoke pass close to the boiler's burner.

Clearly, however, the means of the invention, installed upstream from the superheater, will make it possible to reduce the amount of superheating required.

Figure 2:
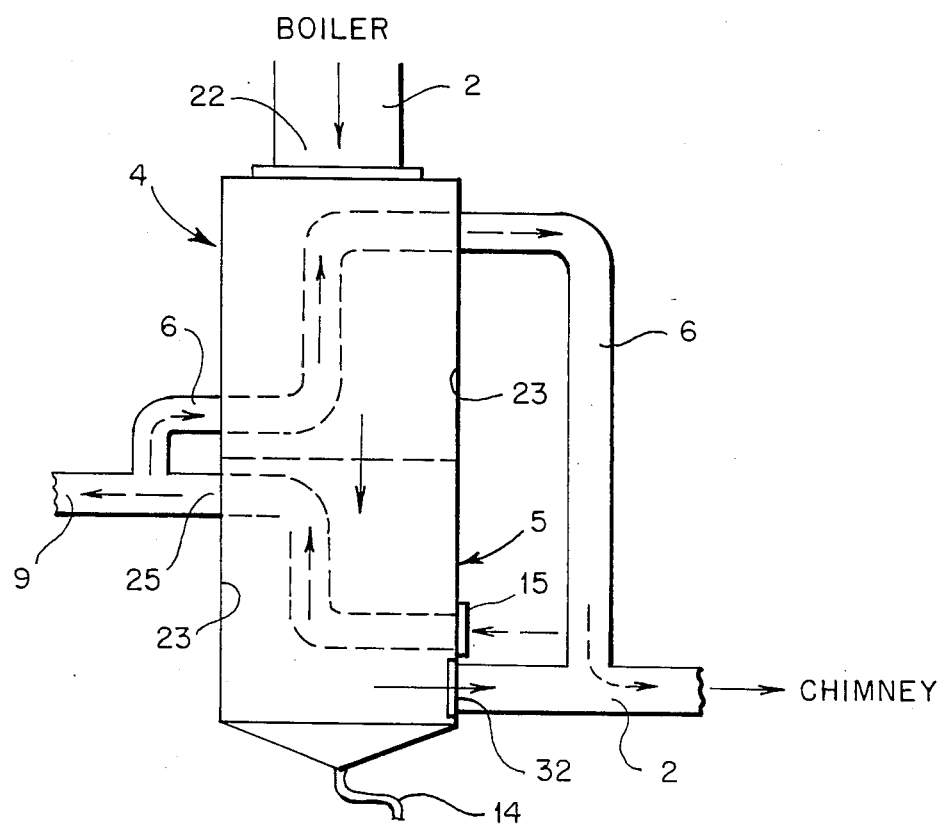
FIG. 2 illustrates an embodiment of the two exchangers of the invention.

FIG. 2 illustrates an embodiment of the two exchangers 4, 5 of the invention.

As illustrated, the two exchangers are placed in series, one below the other. Smoke circulates without discontinuity from one to the other, between an intake 22 provided near the top of exchanger 4 and an outlet 32 provided near the base of exchanger 5.

Advantageously, the smoke moves against the direction of circulation of air within the exchangers (outside air or recycled air).

This "stacked" arrangement of the two exchangers makes it possible to provide only one outlet 14 for condensates located toward the base of exchanger 5 (if the latter is placed second in the smoke circuit). Furthermore, although the partial dehydration of the smoke is accomplished for the most part at exchanger 5, by exchange with the strongest air flow, if some initial condensation of smoke were to occur at exchanger 4, as a result of the operating conditions of a particular plant, the condensates formed would trickle over the outer walls 23 shared by the two exchangers and would be recovered at 14.

The two exchangers may be made from a polymer.

In this way, a small, compact, high-efficiency unit, easily inserted between the boiler outlet and the flue leading to the stack may be produced.

By way of nonlimitative example, the results of tests performed on the means of the invention are presented in the following table.

"tem" represents the limit temperature of the mixture of recycled air and smoke, above which the mixture cannot condense on the surfaces of the exhaust stack.

It should be noted that these tests were performed by diluting a quantity Q of smoke, partially dehydrated after leaving exchangers 4, 5, with an essentially equal quantity Q of recycled air.

The power output of the boiler in this case was approximately 500 kW. The height of the essentially circular smokestack was 20 meters. The stack was on the order of 400 mm in diameter. It was an outdoor stack and was lined with bricks.

In addition to the above table, it will further be noted that for an outside air intake temperature tae of about $-7°$ C., the dew point of the smoke approaching the first exchanger it encounters is on the order of 50° C., and that the water content of said smoke is approximately 100 g per kilogram of dry smoke.

Furthermore, leaving the two exchangers, but prior to dilution, the dew point is approximately 27° C., and the water content has dropped to 24 g per kilogram of dry smoke. The efficiency of the "drying" exchangers is therefore about 76 percent.

After the smoke has been diluted with recycled air, its dew point is approximately 17° C. and its water content about 12 g per kilogram of dry smoke, yielding an efficiency quotient of 88 percent. This means that 88 g out of every 100 g of water contained in a kilogram of dry smoke at intake have been eliminated.

It is therefore clearly apparent that the reduction in the risk of condensation of "wet" smoke produced by the boiler is obtained by partial dehydration by one or both of exchangers 4, 5 and by dilution of said partially dehydrated smoke with hot recycled air.

Although the invention has been described solely with reference to a combustion reaction occurring in

| tae | t° r · ch | ηch | tfe | tfs | ta$_1$ | ta$_2$ | tre | te | tem |
|---|---|---|---|---|---|---|---|---|---|
| $-7°$ C. | 60° C. | 96,5% | 80° C. | 28° C. | 27,5° C. | 64° C. | 17° C. | 46° C. | 41,5° C. |
| 2° | 45° | 100% | 60° | 27° | 28° | 50° | 17° | 38,5° | 32° |
| 11° | 30° | 105% | 45° | 22,5° | 24° | 39° | 16° | 31° | 21° |
| 18° | 18° | 107% | 35° | 23° | 25° | 32° | 18,5° | 27,5° | 19° |
| $-7°$ | 40° | 102% | 55° | 21° | 15° | 43° | 10° | 32° | 27° |
| 2° | 32° | 104,5% | 47° | 19,5° | 18° | 38° | 12° | 29° | 22° |
| 11° | 24° | 106% | 40° | 20,5° | 22° | 35° | 15° | 27,5° | 19° |
| 18° | 18° | 107% | 35° | 23° | 25° | 32° | 18,5° | 27,5° | 19° |

In the table:

"tae" represents the intake temperature of the outside air;

"t°r.ch" represents the temperature of water returned to the boiler;

"ηch" corresponds to the boiler's output;

"tfe" represents the temperature of smoke leaving the boiler (or entering the first exchanger in the smoke circuit);

"tfs" represents the temperature of smoke leaving the second exchanger in the smoke circuit;

"ta1" represents the temperature of the outside air after passing through "dehydrating" exchanger 5;

"ta2" represents the temperature of the recycled air leaving "heating" exchanger 4;

"tre" represents the dew point of the mixture of recycled air and partially dehydrated smoke;

"te" corresponds to the temperature of the mixture of recycled air and partially dehydrated smoke; and the burner of a gas-fired boiler producing "wet" smoke, a solid and/or liquid fuel could very will be used without thereby exceeding the scope of the invention. One might equally well apply the process and means of the invention to the drying of "smoke," fumes, or gaseous mixtures produced in the course of all sorts of chemical reactions occurring in reaction chambers.

In such a case, the recovery in lines 9 and/or 17 of outside air that is not recycled at point 6 will naturally depend on the conditions required for the chemical reaction in question; this air may very well be simply discharged.

What is claimed is:

1. A process for drying moisture-containing smoke which is produced by a chemical reaction in a chamber before said smoke is discharged through a stack comprising:

(a) passing outside air, which is at a lower temperature than that of said smoke, in an initial heat exchange relationship with the smoke, thereby heating said outside air, said heat exchange being made near the point at which said smoke leaves said chamber;

(b) passing at least a portion of the resulting heated air in a second heat exchange relationship with the smoke; and (c) mixing the resulting heated air with the resulting partially dehydrated smoke and discharging the resulting mixture through said stack.

2. A process in accordance with claim 1 wherein said smoke is partially dehydrated in said initial heat exchange relationship.

3. Process of claim 1, characterized in that during said heat exchange between smoke and outside air, a portion of the water vapor contained in said smoke is condensed and the resulting condensates are eliminated.

4. Process of claim 1, characterized in that a flow of outside air equal to approximately five to 10 times the flow of smoke is taken in, of which only an amount substantially equal to the amount of said smoke is recycled and mixed.

5. Process of claim 1, characterized in that at least some of the unrecycled flow of outside air is recovered and directed toward the chamber.

6. Process of claim 1, characterized in that the mixture of heated air and partially dehydrated smoke is superheated before being discharged through the stack.

7. Installation of the type designed to dry "wet" smoke produced by a chemical reaction in a chamber before said smoke is discharged through the stack, characterized in that it comprises:

at least one initial exchanger installed in the exhaust circuit, within which a stream of air taken in from the outside is circulated in a heat exchanging process with smoke issuing from the chamber; and a circuit for recycling at least some of the air that passes through the first exchanger, with said recycling circuit being connected to the air outlet of said first exchanger and to the exhaust circuit, downstream from the point at which smoke leaves said first exchanger.

8. Installation of claim 7, characterized in that said first exchanger essentially forms a condenser that partially dehydrates smoke through heat exchange with said flow of outside air, which is admitted at a temperature lower than that of the smoke, with said first exchanger further comprising a discharge line for the resulting condensates.

9. Installation of claim 7, characterized in that said air recycling circuit comprises at least one flap for controlling the flow of recycled air.

10. Installation of claim 7, characterized in that it comprises a superheater positioned in the smoke exhaust circuit.

11. Installation of claim 7, characterized in that at least one fan is provided for circulating air and/or smoke, the operation of which is suspended when the chemical reaction in the chamber is interrupted.

12. Installation of claim 7, characterized in that it comprises a second heat exchanger, the essential purpose of which is to raise the temperature of the recycled air, said second heat exchanger being positioned within the smoke exhaust circuit and in the path of said air-recycling circuit.

13. Installation of claim 12, characterized in that said pair of exchangers is positioned in series, one below the other, with smoke moving without interruption from one exchanger to the other against the direction of air circulation.

* * * * *

UNITED STATES PATENT AND TRADEMARK OFFICE
CERTIFICATE OF CORRECTION

PATENT NO.    :    4,753,178
DATED         :    June 28, 1988
INVENTOR(S)   :    Remy Cordier, et al.

It is certified that error appears in the above-identified patent and that said Letters Patent is hereby corrected as shown below:

Column 1, line 16, change "nonnegligible" to --significant--;

line 19, change "humidity" to --moisture--.

Column 2, line 7, after "pump" insert --so that it is--.

Column 4, line 36, change "It" to --If--.

Column 5, line 61, change "tal" to --$ta_1$--;

line 63, change "ta2" to --$ta_2$--.

Column 6, line 49, change "will" to - -well--.

Signed and Sealed this

Sixth Day of December, 1988

*Attest:*

DONALD J. QUIGG

*Attesting Officer*    *Commissioner of Patents and Trademarks*